United States Patent
Sugahara

(10) Patent No.: US 6,570,121 B1
(45) Date of Patent: May 27, 2003

(54) LASER MACHINING APPARATUS

(75) Inventor: Masayuki Sugahara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/914,758

(22) PCT Filed: Mar. 5, 1999

(86) PCT No.: PCT/JP99/01087

§ 371 (c)(1), (2), (4) Date: Jan. 11, 2002

(87) PCT Pub. No.: WO00/53363

PCT Pub. Date: Sep. 14, 2000

(51) Int. Cl.7 .............................................. B23K 26/00
(52) U.S. Cl. ............................................... 219/121.61
(58) Field of Search ......................... 219/121.6, 121.61, 219/121.62, 121.85

(56) References Cited

FOREIGN PATENT DOCUMENTS

| JP | 4-33788 | 2/1992 | ........... B23K/26/00 |
|----|---------|--------|----------------------|
| JP | 7-112287 | 5/1995 | ........... B23K/26/00 |
| JP | 7-223085 | 8/1995 | ........... B23K/26/00 |
| JP | 9-66377 | 3/1997 | ........... B23K/26/00 |

*Primary Examiner*—Samuel M. Heinrich

(57) ABSTRACT

A laser working apparatus is provided with program analysis means for analyzing a work program and outputting a move command of each axis and an on/off command for turning on/off a laser beam, interpolation means for performing interpolation processing based on the move command and outputting a move distance to a servo amplifier, move distance setting means for setting a move distance for delay operation, and beam on/off delay means for delaying a beam on/off command output to a laser oscillator based on the actual move distance after the on/off command is output and the move distance for delay operation.

4 Claims, 4 Drawing Sheets

```
N01M120
N02G2X0Y10.I5.J0
N03G2X0Y10.I0J-10.
N04G2X5.Y5.I0J-5.
N05M121
```

N02M120G2X0Y10.I5.J0
N03G2X0Y10.I0J-10.
N04G2X5.Y5.I0J-5.

LASER MACHINING APPARATUS

TECHNICAL FIELD

This invention relates to a laser working apparatus for working in a laser beam and in particular to a laser working apparatus for enabling beam on/off or a work condition to be changed in a work program.

BACKGROUND OF THE INVENTION

FIG. 3 is a block diagram of a general laser working apparatus. In the figure, a CPU 1 reads a work program, a work condition, a parameter, etc., stored in RAM 3 based on a control program stored in ROM 2 and controls the whole laser working apparatus. Key operation of setting a parameter, etc., screen display, and the like are performed through a setting and display 4. An I/O unit 5 inputs/outputs a signal responsive to turning on/off a laser beam or a work condition from/to a laser oscillator 6 and a working machine 7 in response to processing of the CPU 1. A servo amplifier 8 drives a servomotor of each axis of the working machine in response to an axis move command of the CPU 1.

FIG. 4 is a block diagram of work program processing in a related art. Program analysis means 10 analyzes a work program 9 input to a laser working apparatus and if a position command exists, sends a move command of each axis to interpolation means 11. The interpolation means 11 performs interpolation processing responsive to a command speed and a command position and outputs a move distance to a servo amplifier 8. If the work program contains a beam on/off command or a work condition command, the program analysis means 10 analyzes the command and sends a signal output command to an I/O unit 5.

FIG. 5 shows an example of a work program for making a circular hole and FIG. 6 shows an axis move locus in the program. Block N01 is a beam on command and hole making called piercing is performed at this position. In block N02, cutting is executed from the piercing position to the circumferential portion of the circular hole. In block N03, the circumferential portion is cut. In block N04, the inside is entered from the circumferential portion with the beam on. In block N05, the beam is turned off. If working is performed starting at the circumference, the piercing trail is left in the circular hole and thus working often is started at the inside as in block N02. If moving is stopped at the end point of N03 where the circular hole is cut out and the beam is turned off, a slight convex part of the cutout part may remain and thus a method of escaping to the inside of the circular hole with the beam on as in N04 may be adopted.

FIG. 7 is a schematic drawing of axis move, beam on/off processing, and work time when the work program in FIG. 5 is processed in the work program processing in the related art. In N01, beam on processing is performed and after the beam is turned on, move in N02, N03, N04 is executed and after the move terminates, the beam is turned off in N05. The work time becomes T in total.

Since the work locus in N02 and N04 does not relate to the actually necessary work shape (in this case, circular hole), if the beam is turned on during moving in N02 and is turned off during moving in N04, the work time can be shortened. For this purpose, however, if a beam on/off command and a move command are entered in the same block, for example, as in FIG. 8, the beam is turned on at the same time as move start in N02 and is turned off at the same time as move start in N04 and thus the beam is not always turned on/off at a proper position. That is, the N03 block may be entered before a sufficient beam passes through a workpiece, or a beam may be turned off before sufficiently escaping from the circumference.

To deal with this, it becomes necessary to prepare a program by trial and error in such a manner that the move commands in N02 and N04 are further subdivided into multiple blocks and a beam on/off command is entered at a proper position; a problem of an extremely cumbersome job is involved. A method of delaying execution of a beam on/off command by a predetermined time interval is also available. However, if move speed is changed or a command with no move (a subprogram call command, a coordinate system setting command, or the like) is inserted, the relationship between the time and the position changes and thus a beam cannot necessarily be turned on/off at a proper position; this is a problem.

It is an object of the invention to solve the above-mentioned problems and provide a laser working apparatus for making it possible to turn on/off a beam at an optimum position during moving by making easy adjustment and shorten the work time.

DISCLOSURE OF THE INVENTION

According to the invention, there is provided a laser working apparatus comprising program analysis means for analyzing a work program and outputting a move command of each axis and an on/off command for turning on/off a laser beam, interpolation means for performing interpolation processing based on the move command and outputting a move distance to a servo amplifier, move distance setting means for setting a move distance for delay operation, and beam on/off delay means for delaying a beam on/off command output to a laser oscillator based on the actual move distance after the on/off command is output and the move distance for delay operation.

Therefore, if a beam on/off command is given in the work program, a signal output command is not immediately sent and when the actual move distance after the beam on/off command is output reaches the setup move distance for delay operation, a beam on/off signal output command is sent, so that adjustment can be made so as to turn on/off the beam at a proper position simply by changing the setup move distance, and it is made possible to shorten the work time.

In the laser working apparatus of the invention, the move distance setting means enables the move distance for delay operation for beam on and the move distance for delay operation for beam off to be set to separate values.

Therefore, beam on and beam off can be easily adjusted to proper positions.

According to the invention, there is provided a laser working apparatus comprising program analysis means for analyzing a work program and outputting a move command of each axis and a change command for changing a work condition, interpolation means for performing interpolation processing based on the move command and outputting a move distance to a servo amplifier, move distance setting means for setting a move distance for delay operation, and condition change delay means for delaying the timing of actually changing the work condition based on the actual move distance after the change command is output and the move distance for delay operation.

Therefore, to use work condition change as an alternative to beam on/off, the work condition change is not immediately executed and when the actual move distance after a work condition change command is output reaches the setup move distance for delay operation, the work condition change is executed, so that adjustment can be made so as to execute the work condition change at a proper position simply by changing the setup move distance, and it is made possible to shorten the work time.

In the laser working apparatus of the invention, the move distance setting means enables the move distance for delay operation applied if a predetermined work condition value increases and the move distance for delay operation applied if the predetermined work condition value decreases to be set to separate values.

Therefore, each work condition change can be easily adjusted to a proper position.

BEST MODE FOR CARRYING OUT THE INVENTION

A preferred embodiment according to the invention will be discussed with reference to the accompanying drawings.

Figure 1:
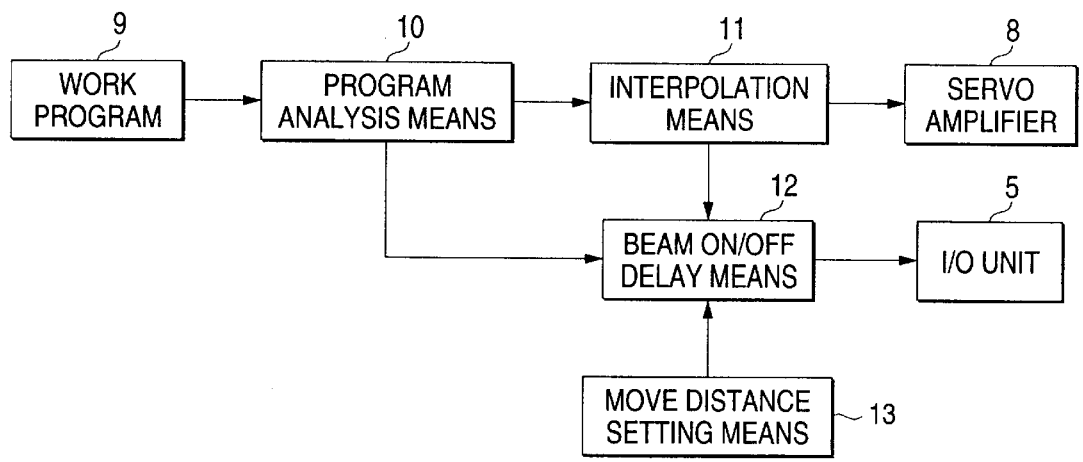
FIG. 1 is a block diagram of work program processing in an embodiment of the invention.

FIG. 1 is a block diagram of work program processing in the invention. Program analysis means 10 analyzes a work program 9 input to a laser working apparatus and if a position command exists, sends a move command of each axis to interpolation means 11. The interpolation means 11 performs interpolation processing responsive to a command speed and a command position and outputs a move distance to a servo amplifier 8. Processed move distance information is input to beam on/off delay means 12. On the other hand, move distance information for delay operation set in move distance setting means 13 is also input to the beam on/off delay means 12. If the beam on/off delay means 12 receives a beam on/off command from the program analysis means 10, it does not immediately send a signal output command to an I/O unit 5 and compares the information from the interpolation means 11 and the information from the move distance setting means 13. When the move distance processed by the interpolation means 11 reaches the move distance for delay operation set in the move distance setting means 13 after the beam on/off command is given, the beam on/off delay means 12 sends a beam on/off signal output command to an I/O unit 5.

In the move distance setting means 13, a move distance for beam on and a move distance for beam off maybe set to separate values. The move distance from the interpolation means 11 may be set to a move distance not only in one move block, but also across two or more move blocks, of course.

Figure 2:
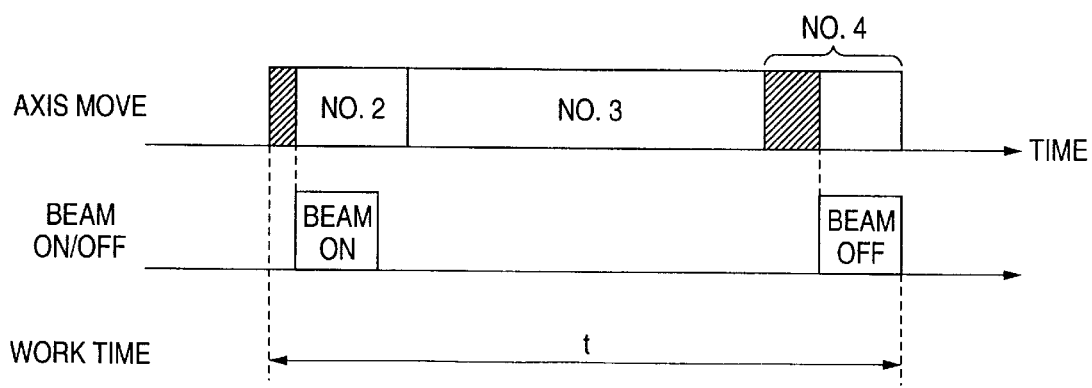
FIG. 2 is a schematic drawing of axis move, beam on/off, and work time in the embodiment of the invention.
Figure 3:
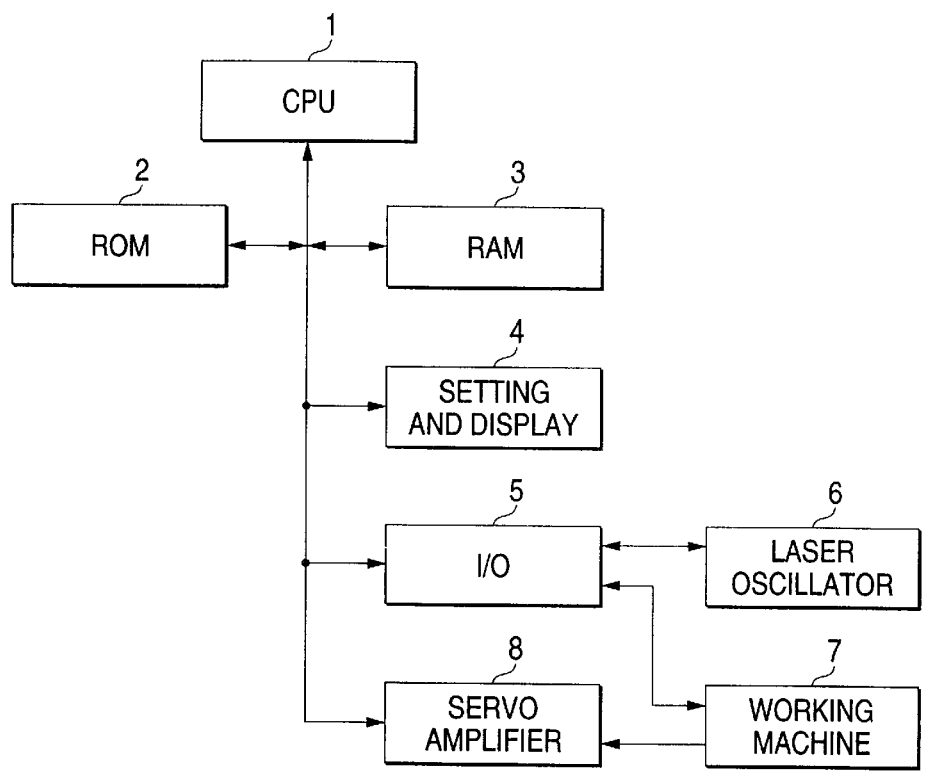
FIG. 3 is a block diagram of a laser working apparatus.
Figure 4:
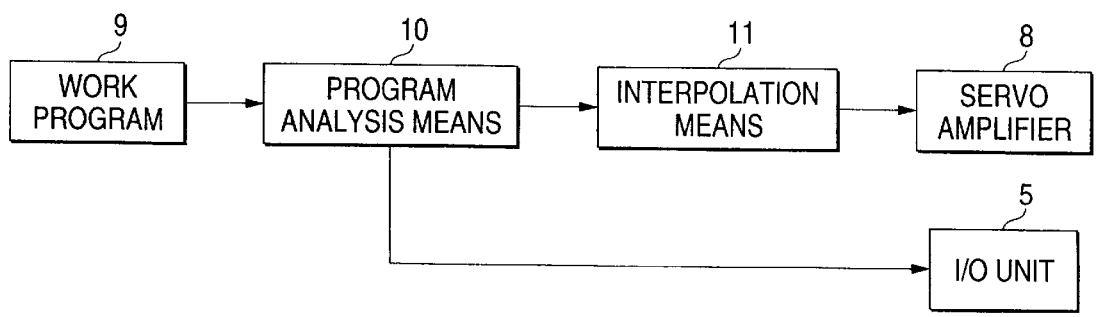
FIG. 4 is a block diagram of work program processing in a related art.
Figures 5, 6:
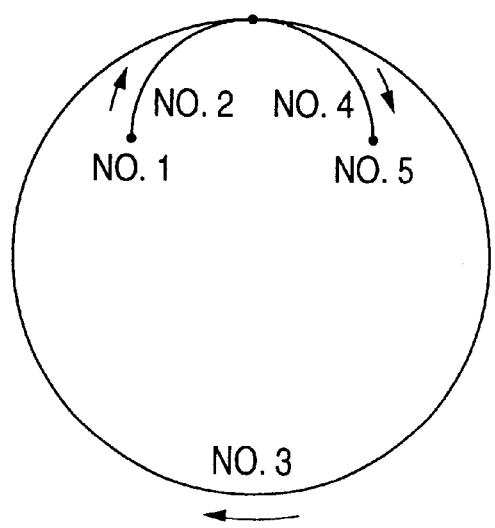
FIG. 5 shows an example of a work program for making a circular hole.
FIG. 6 is a drawing to show an axis move locus in the circular ark work program.
Figures 7, 8:
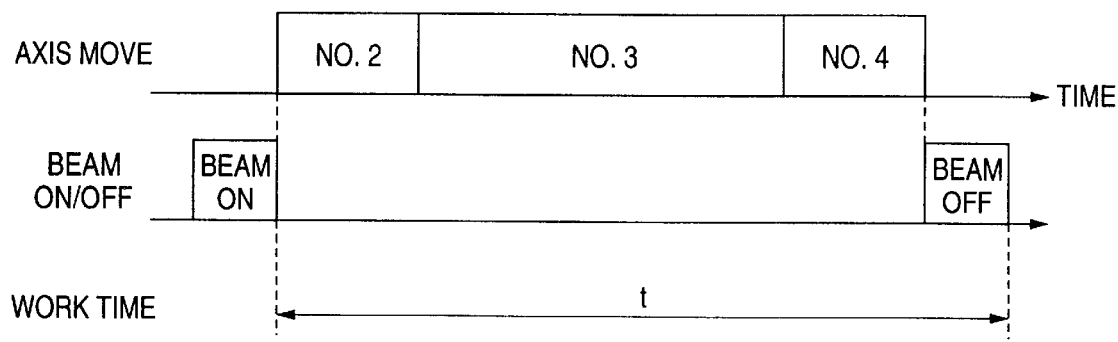
FIG. 7 is a schematic drawing of axis move, beam on/off, and work time in the related art.
FIG. 8 shows a modified example of the circular ark work program.

FIG. 2 is a schematic drawing of axis move, beam on/off processing, and work time when the work program in FIG. 8 is processed in the embodiment. In FIG. 2, the horizontal axis basically is shown as time, but the parts shaded in the figure correspond to the move distances for beam on and off set in the move distance setting means 13 relative to the move distances in N02 and N04 rather than the time. In N02, the beam on command and the move command are processed at the same time, but a beam is actually turned on at a position after a move as much as the setup move distance in the shaded portion from the move start in N02. Likewise, in N04, the beam off command and the move command are processed at the same time, but the beam is actually turned off at a position after a move as much as the setup move distance in the shaded portion from the move start in N04. The beam on/off timing can be easily adjusted simply by changing the setup move distance, and total work time t can be made shorter than the work time T in FIG. 7. If a command with no move or the like is placed at some midpoint in the program and the processing time changes, the beam can be turned on/off at the same position.

Various work conditions other than beam on/off may be changed depending on the work contents. For example, laser output is set to 0 or pulse duty is set to 0% as an alternative to beam off. In such a case, a similar effect can be produced by delaying change in a signal corresponding to a work condition as with the case of the beam on/off signal described above.

To change not only beam on/off, but also a work condition at a proper position during moving, it is made possible by making easy setting change only, needless to say.

Industrial Applicability

As described above, the laser working apparatus according to the invention is suited for use as an industrial laser working apparatus for micromachining requiring compatibility between high work accuracy and productivity, for example.

What is claimed is:

1. A laser working apparatus, comprising;
program analysis means for analyzing a work program and outputting a move command for each axis and an on/off command for turning on/off a laser beam, interpolation means for performing interpolation processing based on the move command and outputting a move distance to a servo amplifier, move distance setting means for setting a move distance for a delay operation, and beam on/off delay means for delaying a beam on/off command output to a laser oscillator based on an actual moved distance after the on/off command is output and the move distance for the delay operation.

2. The laser working apparatus as claimed in claim 1 wherein said move distance setting means enables the move distance for the delay operation for a beam "on" operation and the move distance for the delay operation for a beam "off" operation to be set to separate values.

3. A laser working apparatus, comprising;
program analysis means for analyzing a work program and outputting a move command for each axis and a change command for changing a work condition, interpolation means for performing interpolation processing based on the move command and outputting a move distance to a servo amplifier, move distance setting means for setting a move distance for a delay operation, and condition change delay means for delaying a timing of actually changing the work condition based on an actual moved distance after the change command is output and the move distance for the delay operation.

4. The laser working apparatus as claimed in claim 3 wherein said move distance setting means enables the move distance for the delay operation which is applied if a predetermined work condition value increases, and the move distance for the delay operation which is applied if the predetermined work condition value decreases, to be set to separate values.

* * * * *